United States Patent [19]

König

[11] Patent Number: 5,330,344
[45] Date of Patent: Jul. 19, 1994

[54] APPARATUS FOR FORMING DOUGH

[76] Inventor: Helmut König, Statteggerstrasse 80, A-8045 Graz, Austria

[21] Appl. No.: 890,545

[22] Filed: May 28, 1992

[30] Foreign Application Priority Data

May 31, 1991 [AT] Austria ................. 1109/91

[51] Int. Cl.$^5$ ................. A21C 3/06; A21C 3/10; B29C 53/18; B29C 53/32
[52] U.S. Cl. ................. 425/321; 425/367; 425/371; 425/372; 425/373; 426/500; 426/501
[58] Field of Search ........... 425/140, 141, 364 R, 425/371, 372, 373, 321, 320, 367, DIG. 7; 426/500, 501, 512

[56] References Cited

U.S. PATENT DOCUMENTS

| | | | |
|---|---|---|---|
| 2,576,670 | 11/1951 | Cohen | 426/501 |
| 2,881,715 | 4/1959 | Heim | 425/372 |
| 3,121,406 | 2/1964 | Kieffaber | 427/371 |
| 4,435,144 | 3/1984 | Kemper | 425/371 |
| 4,767,638 | 8/1988 | Uhrovic | 425/321 |
| 4,869,661 | 9/1989 | Nogueroles | 425/371 |
| 4,976,600 | 12/1990 | Willett | 425/321 |
| 4,981,427 | 1/1991 | Prignitz | 425/371 |
| 4,996,915 | 3/1991 | Morikawa et al. | 425/321 |
| 5,078,585 | 1/1992 | Morikawa et al. | 425/372 |
| 5,151,024 | 9/1992 | Hayashi | 425/373 |

FOREIGN PATENT DOCUMENTS

| | | | |
|---|---|---|---|
| 251138 | 1/1988 | European Pat. Off. | 425/371 |
| 1190897 | 4/1965 | Fed. Rep. of Germany | 425/371 |

*Primary Examiner*—Khanh Nguyen
*Attorney, Agent, or Firm*—Salter, Michaelson & Benson

[57] ABSTRACT

An apparatus for flattening and, if desired, rolling of portioned dough pieces has a head machine that delivers dough pieces to conveyor belts by which the dough pieces are conveyed to a first endless running belt. This belt constitutes the support for a flattening station that flattens the dough pieces. By this first endless running belt the dough pieces are conveyed to a further endless running belt disposed below the first band said second band conveying the dough pieces back again towards the head machine. Thereby the overall length of the apparatus is shortened. The two belts constitute a further processing station for the dough pieces. If the two belts run with the same speed, the dough pieces are further flattened or, if the two belts show different speeds, the dough pieces are rolled.

25 Claims, 1 Drawing Sheet

APPARATUS FOR FORMING DOUGH

FIELD OF THE INVENTION

The invention relates to an apparatus for forming portioned dough pieces, in particular to an apparatus for flattening and/or rolling of portioned dough pieces, preferably of round-kneaded dough pieces that are delivered up from a head machine, preferably by means of conveyor belts, for example divergent belts, to a first endless running belt means that leads the dough pieces to a forming station, for example to a flattening station disposed above that belt means, a second endless running belt means being disposed below the first running endless belt means, to which second belt means the dough pieces are delivered up by the first endless running belt means.

THE PRIOR ART

Such known apparatus produce flat dough pieces that, if desired, are then rolled, for example for producing crescent rolls, salted rolls or the like. The known apparatus have a considerable overall length, in particular then, if the flattened dough pieces must be rolled, because then two working stations are disposed one behind the other, namely the flattening station and the rolling station. The second endless running belt to which the dough pieces finally are delivered up, leads the dough pieces to the further working place. Therefore, as a rule, the output end of the machine is disposed in a considerable distance from the head machine so that two persons are necessary to operate the machine.

SUMMARY OF THE INVENTION

The invention has at its object to improve such an apparatus so that the overall length is shortened and that the machine can be operated by one single person only. Further, the invention has at its object to make use of the second endless running belt means disposed below the first endless running belt means so that this second belt is used for a further working purpose. The invention solves this task—starting from the initially described known embodiment—by the features that the carrying runs of the second endless running belt conveys the dough pieces back in direction to the head machine and that this carrying run together with the lower run of the first endless running belt constitutes a further forming device for the dough pieces. In such a manner, the dough pieces are conveyed back in the region of the head machine so that they can be taken off from the second endless running belt or, respectively, from a drawer connected thereto, by the person operating the head machine. A further advantage consists in that the operating person can easily and quickly determine from the first delivered dough pieces whether or not the desired adjustment of the head machine is given, so that this person can change this adjustment at the earliest possible moment. Within the known construction this is not so easily possible because within this known embodiment the person operating the head machine must at first walk towards the output end of the apparatus and must inspect the dough pieces there, then this person must walk back to the head machine in order to change its adjustment, or two operating persons must communicate by shouts. However, the carrying run of the second running endless band conveying the dough pieces back to the head machine again has not only this function but constitutes also a support member for the dough pieces during the forming action of the lower run of the first endless running belt means. This first endless running belt means, therefore, acts on the dough pieces at two forming operations from which the first is exerted by the forming station disposed above the first endless running belt, whereas the second forming action is made by the carrying run of the second endless running belt together with the lower run of the first endless running belt. Therefore, a second forming of the dough pieces is possible without additional expenditure.

As already mentioned, a particular advantage of the inventive embodiment consists in that the two belts disposed one above the other can be made useful for a further operating step. Thus, according to a further development of the invention the speed of the second endless running band can be chosen as great as the speed of the first endless running belt so that both belts together constitute a flattening station for the dough lumps. In such a manner it is possible to flatten the dough pieces in more than one step and, therefore, particularly intensive, particularly then, if already in the region of the conveying belts and/or in the region of the upper endless running belt a flattening station is disposed. Such a multi-step flattening of the dough pieces enables one to operate the machine at an increased speed, if the same final height of the dough pieces is considered.

However, within the spirit of the invention, the speed of the second endless running belt may be chosen different from that of the first endless running belt, so that the two belts together constitute a rolling station for the dough pieces. In such a manner, this rolling station is disposed below the first endless running belt and no more—as this is the case within the known construction—adjacent to the carrying run of this belt so that the overall length of the apparatus is considerably reduced in comparison to the known construction.

In order to change at choice from the described first mode of operation to the other mode of operation, according a further development of the invention the speed of the first endless running belt is made adjustable.

Further it is of advantage if the height of the first endless running belt is adjustable with respect to the second endless running belt. This enables one to adjust the flattening effect on the dough pieces or, respectively, the rolling effect exerted on the dough pieces. Suitably, this height adjustment can be made so extensive that the dough pieces conveyed by the second endless running belt below the first endless running belt are no more touched by the first endless running belt. Then, the forming action on the dough pieces made by the two bands is shut off. Therefore, the apparatus can also be so operated that the dough pieces are formed, for example provided with a star, in the region of the conveying belts or in the region of the upper run of the first endless running belt, and that the shape of the dough pieces made by this forming action remains unchanged until the dough pieces are put off from the apparatus near the head machine.

According to a preferred embodiment of the invention the second and preferably also the first endless running belt is bearingly swivellable around a vertical axis so that that end of this belt or, respectively, of the belts neighbouring the head machine can be swivelled relative to the head machine in horizontal direction between an operating position and a rest position, and wherein this belt or, respectively, the two belts in the operating position extend obliquely with respect to the delivering direction of the dough pieces ejected from the head machine, particularly obliquely to the longitudinal direction of the conveying belts, however in the rest position parallel thereto. The said operating position facilitates putting off the dough pieces from the apparatus and therefore simplifies the work of the operator. In the rest position, the apparatus requires few space only because in this rest position the two belts are disposed below the conveying belts and therefore are disposed in a space-saving manner.

BRIEF DESCRIPTION OF THE DRAWINGS

Further features and advantages of the invention can be seen from the following description of an examplative embodiment of the invention which is schematically shown in the drawings.

DESCRIPTION OF THE PREFERRED EMBODIMENT

Figure 1:
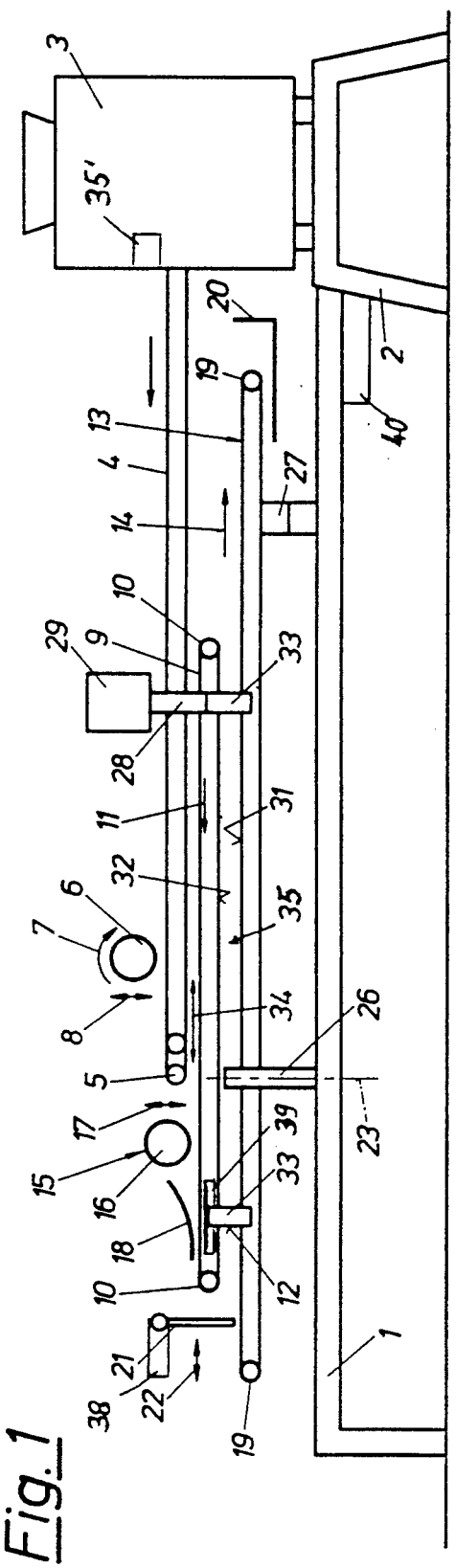
FIG. 1 shows a side view of the apparatus in its rest position.

The apparatus has a base frame which simultaneously constitutes a base 2 for a head machine 3 that divides a bigger lump of dough into dough portions destined for the production of baked articles. Preferably, these dough portions are also kneaded in the head machine 3. The portioned dough pieces are laid by the machine 3 onto deliver bands 4, only two of which are shown in the drawing for simplification's sake, however, in practice more of such deliver bands 4 may be provided adjacent each other. These endless running deliver bands may be disposed in a divergent manner in a horizontal direction away from the head machine 3. Those ends 5 of the bands 4 that do not face the head machine 3 are preferably staggered or offset relative to each other in longitudinal direction of the bands and the amount of this staggered arrangement or, respectively, the position of the ends 5 may be adjustable by a suitable adjustment means 35' known per se. A flattening member 6, for example a pressure roller, is bearingly supported on the base frame 1 above the bands 4 and is driven for rotation in direction of the arrow 7. The vertical position of this flattening member 6 may be adjusted by suitable means 36 in direction of the double arrow 8 in order to enable one to vary the flattening of the dough pieces. At the ends 5 of the deliver bands 4, the already somewhat flattened dough pieces are delivered to a first running endless band 9 which may be a usual conveyor belt and is driven for run around rollers 10 in direction of the arrow 11. The rollers 10 and, if desired, further guide means for the band 9 are bearingly supported in a frame 12 that simultaneously constitutes a similar frame for a second similar band 13 disposed below the first band 9 and being driven for run in direction of the arrow 14. This direction 14 of the band 13, therefore, is the same as that of the lower run 32 of the band 9. A flattening station 15 is mounted on the frame 12 above the band 9, preferably in a form of a pressure roller 16, the vertical position of which may be adjustable by suitable means 37 in direction of the double arrow 17 in order to adjust the flattening effect on the dough pieces running below this pressure roller 16. Behind this flattening station 15 (seen in direction of travel of the dough pieces), a drag band 18 is connected to the frame 12, preferably in form of a chain band or the like that slides on the dough pieces running below the drag member 18, so that the dough pieces are rolled, if such a rolling effect is desired. If not, the drag band 18 is correspondingly lifted or taken off. At that roller 10 of the first endless running belt 9 that does not face the head machine 3, the dough pieces are thrown from this band 9 onto the band 13 that is disposed below and as a rule extends parallel to the band 9. This second band 13 conveys the dough pieces back in direction towards the head machine 3. The roller 19 of this band 13 that faces the head machine 3 is disposed above a drawer 20 slidingly guided in the frame 12 and the dough pieces are thrown by the band 13 onto this drawer 20. The latter mentioned roller 19 of the band 13 is so disposed that the lower band 13, seen from above, protrudes beyond the upper band 9 so that delivering up of the dough pieces from the band 9 onto the band 13 is possibly without any problem. In order to ensure this deliver-up, a correction flap 21 may be mounted on the frame 12, which flap is preferably adjustable by suitable means 38, the adjustment direction being indicated by a double arrow 22.

Figure 2:
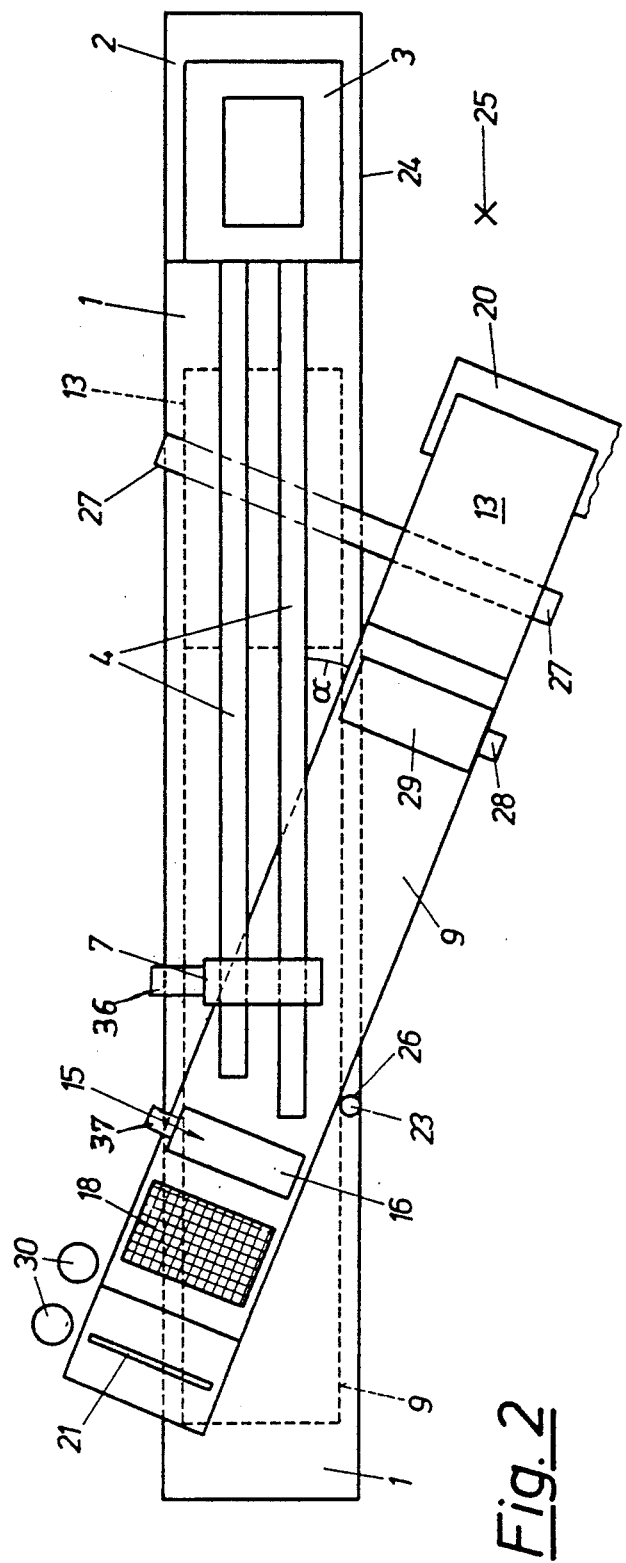
FIG. 2 shows a view from above to the apparatus in its operation position.

The frame 12 that carries the two belts 9,13 can be swivelled by hand with respect to the base frame 1 in horizontal direction around a vertical axis 23 so that that end of the band 13 that neighbours the head machine 3 is brought into the reaching area of the hands of the operator who stands at the front side 24 of the head machine 3 at the place 25 marked with a cross. For this, the frame 12 is connected to a swivel bearing 26 that is fixed to the base frame 1. This swivel bearing 26 is disposed at the front side of the base frame 1 or, respectively, of the frame 12, that means, on that side at which the operator stands at the place 25. The maximum swivel angle α at which the two belts 9,13 can be swivelled with respect to the longitudinal direction of the conveyor belts 4, amounts to about 30° (FIG. 2). In order to relieve the swivel bearing 26 of the load, the end of the frame 12 neighbouring the head machine 3 is abutted on the base frame 1 by means of a telescopic rail 27. At the same time, this telescopic rail 27 constitutes also a stop for the said swivel motion.

The upper endless running belt 9 may be mounted in the frame 12 in an adjustable shiftable manner by means 39 in the sense of the double arrow 34 with respect to the lower endless running belt 13. The speed of this upper endless running belt 9 can be so chosen that this speed either is equal to the speed of the lower endless running belt 13, or is different from that. If desired, the difference of the two speeds may be adjustable by any suitable means 40. The two belts 9,13 constitute together a further device 35 that acts on the dough pieces so that their shape is changed. If the speed of the two bands 9 and 13 is equal, a flattening of the dough pieces conveyed on carrying run 31 of the lower band 13 back towards the head machine 3 is obtained, provided that the level of the upper running endless belt 9 is suitably chosen with respect to the lower endless running belt 13. If however, the speeds of the two bands 9,13 is chosen differently, a rolling effect on the dough pieces carried by the band 13 is obtained—also provided that the relative level of the two bands 9,13 is suitably chosen. As a rule, one makes the speed of the upper band 9 to be less than that of the lower band 13, however, the said rolling effect can also be By the said staggered disposal of the ends of the conveyor belts 4 that do not face the head machine 3, the transition of the dough pieces from the bands 4 to the upper endless running belt 9 occurs at different moments, particularly then if the output of the dough pieces from the head machine 3 is effected in rows directed perpendicularly to the running direction of the bands 4. By the said oblique position of the endless running belt 9 with respect to the longitudinal direction of the conveyor belts 4 and by the adjustable speed of the endless running belt 9, the disposition of the dough pieces on the band 9 after the deliver-up from the bands 4 can be adjusted at choice so that the distance of the dough pieces from each other can be increased what is of advantage in connection with rolling the dough pieces.

The said oblique position of the two bands 9,13 with respect to the longitudinal direction of the delivery conveyors 4 is the working position of the operator. If desired, the angle α can be adjusted at choice. In order to save space when the machine is not in use, the frame 12 together with the belts 9,13 carried by it can be swivelled back around the axis 23 so that the longitudinal direction of the two belts 9,13 extends parallel to the longitudinal direction of the transfer conveyor belts 4. This rest position is shown in FIG. 2 by dotted lines, the working position, however, is shown by full lines.

The frame 12 carries on its front side a column 28 that extends sidewise of the belt 9. To this column 28 a flouring means 29 is fixed that extends above the upper endless running belt 9 and by which the carrying run of the endless running belt 9 can be sprinkled with flour before putting the dough pieces onto this belt. The said disposition of the column 28 carrying the flouring means on one side of the belts 9,13 only enables one to swivel the band 9,13 into their rest position without that at first the delivery conveyors 4 must be dismounted. In this rest position the column 28 extends sidewise of the delivery conveyor belts 4 and the flouring means 29 is disposed above these belts.

In order to obtain a sufficient distance for what the end of the band 13 neighbouring the head machine 3 can be swivelled, the swivel bearing 26 is suitably fixed to that half of the frame 12 that is more spaced apart from the head machine 3. The telescopic rail 27, however, is by static grounds disposed near the head machine 3 and is suitably pivotally connected at its both ends with the frame 12 or, respectively, with the base frame 1.

If desired, it is possible to make only the lower belt 13 swivellable around the vertical axis 23 and to make the upper belt 9 fixed. This, however, would shorten the region in which the dough pieces can be worked between the two belts 9,13 so that the said swivel arrangement of both belts 9,13 is more favourable.

The motors 30 for driving the belts 9,13 as well as for driving the flattening station 15 are suitably fixed laterally to the frame 12 and are swivellable together with this. The entire machine is provided with a computer control that calls in the corresponding desired programs.

In case of the use of a drawer 20, the removal of the readily formed dough pieces is made by hand, however, the delivery from the lower endless running belt 13 can also be directed to a conveyor belt, if desired, to a further machine, for example a proving compartment or a baking oven.

Instead of the flattening member 6 and/or instead of the flattening station 15 also other stations may be provided for forming or, respectively, processing of the dough pieces, for example dough shaping rollers, stamping means and the like. However, at the said places also no processing of the dough pieces may occur, for example by removal or by corresponding lifting of the stations 6,15 so that then the dough pieces delivered from the head machine 3 onto the belts 4 are processed by the two endless running belts only. In such a manner for example rolling of round-kneaded dough pieces can be obtained. The machine, however, can also be operated in such a manner that the relative distance between the two endless running belts 9,13 is chosen so great that the dough pieces that are conveyed by the carrying run 31 of the lower endless running belt 13 are no more engaged by the lower run 32 of the upper endless running belt 9. The height level adjustment of the upper endless running belt 9 necessary for this and for adjustment of the desired flattening degree can easily be effected by a suitable adjustment means 33 mounted within the frame 12. This adjustment means, for example, may comprise excenters by which the relative distance between two frames can be varied which carry the rollers 10 or, respectively, 19 for the two belts 9 or, respectively, 13.

I claim:

1. Apparatus for forming portioned dough pieces comprising:
   a first endless running belt having a carrying run which travels in a first direction;
   endless conveyor means for conveying portioned dough pieces from a dough portioning device onto said first endless running belt;
   forming means disposed above a downstream end of said first endless running belt for forming dough pieces on said first endless running belt;
   a second endless running belt disposed in parallel relation below said first endless running belt, said second endless running belt having a carrying run travelling in a second generally opposite direction to said first endless running belt, said first endless running belt transferring said portioned dough pieces onto said second running belt at an upstream end of second running belt, said first endless running belt having a lower run which cooperates with said carry run of said second endless running belt for further forming said dough pieces as said dough pieces travel along said second endless running belt;
   a base frame for supporting said first and second endless running belt;
   a swivel bearing mounted on said base frame, said swivel bearing having a vertical axis, said second endless running belt being swivel mounted on said swivel bearing for movement in a generally horizontal plane around said vertical axis between an operating position wherein said second endless running belt is disposed obliquely with respect to said first endless running belt, and a resting position wherein said second endless running belt extends substantially parallel to said first endless running belt.

2. In the apparatus of claim 1, said first and second endless running belts being fixedly connected together in parallel relation by a second frame wherein both of said first and second endless running belts are swivel mounted for movement between said operating position and said resting position.

3. In the apparatus of claim 2, said second frame being connected to said base frame by a telescoping rail.

4. In the apparatus of claim 1, said swivel bearing being positioned in the upstream end half of said second endless running belt.

5. In the apparatus of claim 1, said forming means comprising flattening means for flattening said dough pieces carried by said first endless running belt, said second endless running belt having a speed which is equal to said first endless running belt so that said lower run of said first endless running belt and said carrying run of said second endless running belt cooperate to further flatten said dough pieces.

6. In the apparatus of claim 1, said forming means comprising flattening means for flattening said dough pieces carried by said first endless running belt, said second endless running belt having a speed which is different than said first endless running belt so that said lower run of said first endless running belt and said carrying run of said second endless running belt cooperate to form a rolling station for said dough pieces.

7. The apparatus of claim 1 further comprising speed adjustment means for adjusting a speed of said first endless running belt.

8. The apparatus of claim 1 further comprising height adjustment means for adjusting a height level of said first endless running belt with respect to said second endless running belt.

9. The apparatus of claim 1 further comprising a flouring device disposed above said first endless running belt.

10. In the apparatus of claim 9, said endless conveyor means being disposed above said first endless running belt and running parallel to said first endless running belt, said flouring device being disposed above said first endless running belt so as to overlap said endless conveyor means.

11. The apparatus of claim 2 further comprising means for adjustably longitudinally shifting said first endless running belt with respect to said second endless running belt.

12. In the apparatus of claim 11, said shifting means being mounted on said second frame.

13. In the apparatus of claim 1, said upstream end of said second endless running belt protruding beyond the downstream end of said first endless running belt so that said dough pieces are delivered directly onto said second endless running belt from said first endless running belt.

14. The apparatus of claim 13 further comprising a flap disposed in the region in which said second endless running belt protrudes beyond said first endless running belt.

15. In the apparatus of claim 14, said flap being adjustable.

16. The apparatus of claim 1 further comprising a drag member disposed above said first endless running belt adjacent to said forming means.

17. The apparatus of claim 16 wherein said forming means comprises flattening means for flattening said dough pieces.

18. The apparatus of claim 17 wherein said drag member is removable.

19. The apparatus of claim 16 wherein said drag member is liftable.

20. The apparatus of claim 1 further comprising a flattening member disposed above said conveyor means.

21. In the apparatus of claim 20, said flattening member comprising a pressure roller.

22. In the apparatus of claim 1, said conveyor means comprising first and second endless running belts, said first and second endless running belts having terminal ends, said terminal ends being longitudinally offset relative to each other.

23. The apparatus of claim 22 further comprising means for adjusting the longitudinal offset of said ends of said conveyor belts.

24. In the apparatus of claim 1 said swivel bearing having a maximum swing angle of about 30 degrees.

25. In the apparatus of claim 22, said first and second conveyor belts diverging outwardly from said dough portioning means.

* * * * *